(12) United States Patent
Ikeda

(10) Patent No.: US 7,283,746 B2
(45) Date of Patent: Oct. 16, 2007

(54) OPTICAL VIRTUAL LOCAL AREA NETWORK

(75) Inventor: Hiroki Ikeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 764 days.

(21) Appl. No.: 10/616,636

(22) Filed: Jul. 9, 2003

(65) Prior Publication Data

US 2004/0076163 A1    Apr. 22, 2004

Related U.S. Application Data

(63) Continuation-in-part of application No. 10/247,007, filed on Oct. 18, 2002, now abandoned.

(51) Int. Cl.
*H04J 14/00* (2006.01)
(52) U.S. Cl. .............................. 398/46; 398/47; 398/51; 398/54
(58) Field of Classification Search ............ 398/46–48, 398/51–54; 370/218, 351, 353, 355, 357, 370/359, 397, 399, 395.3, 409, 395.31
See application file for complete search history.

(56) References Cited

U.S. PATENT DOCUMENTS

| 6,075,630 | A | * | 6/2000 | Nishio | 398/25 |
| 7,065,040 | B2 | * | 6/2006 | Nagamine | 370/223 |
| 2002/0156919 | A1 | * | 10/2002 | Maeno | 709/238 |

\* cited by examiner

*Primary Examiner*—Dalzid Singh
(74) *Attorney, Agent, or Firm*—Townsend and Townsend and Crew LLP

(57) ABSTRACT

The maximum number of virtual local area networks (VLANs) is increased beyond the number provided solely with the VLAN ID, by a factor related to the number of wavelengths of a Wavelength Division Multiplexing (WDM) used by a network switching. An optical VLAN number (OVLAN ID) is a combination of the VLAN ID from the packet header and a path or wavelength ID (WL ID) that identifies a selected one of available wavelengths of a WDM transmission line. An Optical VLAN (OVLAN) conversion table stores data of the OVLAN ID, the VLAN ID and optical path ID, for an optical VLAN node.

19 Claims, 14 Drawing Sheets

| TABLE | |
|---|---|
| OVLAN | IN    VLAN    OUT |
| 1 | 1 @ WL1 >> 1 @ WL3 |
| 2 | 2 @ WL1 >> 1 @ WL4 |
| 3 | 1 @ WL2 >> 2 @ WL3 |
|  | ○<br>○<br>○ |
| a | b @ WLc >> d @ WLe |

FIG. 13

| | VLAN ID = 1 | VLAN ID = 2 | ··· | VLAN ID = 4094 |
|---|---|---|---|---|
| WAVE-LENGTH = f1 | USED | USED | | |
| ··· | | | | |
| WAVE-LENGTH = f2 | | | | |

PATH 1

FIG. 14

| INPUT PORT # | VLAN ID IN INCOMING FRAME | OUTPUT PORT # |
|---|---|---|
| 11 | 1 | 21 |
| ... | ... | |
| 11 | 4094 | |
| ... | ... | |
| mn | 1 | |
| ... | ... | |
| mn | 4094 | |

| Input Port # | VLAN ID in Incoming Frame | Output Port # | VLAN ID in Outgoing Frame |
|---|---|---|---|
| 11 | 1 | 21 | 2 |
| ... | ... | | |
| 11 | 4094 | | |
| ... | ... | | |
| mn | 1 | | |
| ... | ... | | |
| mn | 4094 | | |

Figure 17

OPTICAL VIRTUAL LOCAL AREA NETWORK

CROSS-REFERENCES TO RELATED APPLICATIONS

The present application is a continuation-in-part of U.S. patent application Ser. No. 10/247,007, filed on Oct. 18, 2002 now abandoned, which is incorporated by reference.

TECHNICAL FIELD OF THE INVENTION

The present invention relates to a method of and apparatus for building a Virtual Local Area Network (VLAN), especially to by using the IEEE standard tagged frames and the Wavelength Division Multiplexing (WDM) technique.

BACKGROUND OF THE INVENTION

A Local Area Network (LAN) is commonly used in enterprise networks, campus networks, etc. Ethernet, which is a name for a family of LAN technologies standardized by the Institute of Electrical and Electronics Engineers (IEEE) (IEEE 802.3 standard), is one of the most popular and useful techniques for building LANs.

A typical LAN is configured with switches and transmission lines connecting between the switches. The lines are co-axial cables, Unshielded Twisted Pair (UTP) cables or optical fibers. If the lines are optical fibers, because the switches handle electrical signals, port interfaces of the switches have optical/electrical converters and electrical/optical converters.

A VLAN is a broadcast domain whose members communicate with each other as if they shared the same segment even of the members are in different physical LAN segments from each other. In other words, a VLAN is a logical LAN segment.

There are several types of VLANs in the IEEE 802.1Q standard. One of them adds a VLAN identifier (VLAN tag) to a frame, where the frame is sometimes called a tagged frame. FIG. 9 illustrates one example of a tagged Ethernet frame. The destination and source addresses are destination and source MAC (Media Access Control) addresses, respectively. The VLAN protocol identifier is a field with a value of "0x8100". When the field contains the value, the frame is a VLAN tagged frame. The priority is a field indicating the user priority of the frame. CFI stands for Canonical Format Indicator. Canonical format refers to the bit-ordering (Little or Big Endian) of the bytes within a frame. VLAN identifier is a 12-bit field. Both the values of all ones and all zeroes are not available for a VLAN ID, so the maximum number of VLANs identified by the VLAN ID is 4,094. FIG. 18 depicts one simple example of network configuration with VLAN ID. No frame with VLAN ID=1 is forwarded to any member of the VLAN 2.

Recently, Ethernet has come into use in Metropolitan Area Networks (MANs) and Wide Area Networks (WANs) of network carriers. Network carriers control network operation in MANs/WANs and provide communication services between LANs connected to each other by the MANs/WANs. The network carriers may want to provide services like Virtual Private Networks (VPNs). Virtual metropolitan area networks (vMANS™) by Extreme Networks® realize such services. The vMANs scheme is shown in the tech brief entitled "Extreme Networks Virtual Metropolitan Area Networks" by Extreme Networks. In short, vMANs use a tunneling technique with tags called vMAN tags like VLAN tags (VLAN IDs) in the IEEE 802.1Q standard. FIG. 19 shows a concept of the vMAN scheme.

Wavelength Division Multiplexing (WDM) technique is known. The WDM is a technique to multiplex light signals of a plurality of channels over an optical fiber by using a light filter. It makes a larger transmission capacity of an optical fiber.

One of the advantages of the typical LAN with switches is that it can support Virtual Local Area Networks (VLANs), which is the IEEE 802.1Q standard. Rich Seifert, "The Switch Book", John Wiley & Sons, Inc., Chapters 11 and 12, gives details about VLAN technique.

The U.S. Pat. No. 5,572,347 relates to a switched video architecture and it shows an integrated fiber optic telecommunications network providing switched video and standard narrow band telephone services. Frequency division multiplexing of the narrow band telephone service and control signals with EM channels for video distribution is used.

The U.S. Pat. No. 6,269,098 B1, to Crayford, issued Jul. 31, 2001, routes VLAN packets. The address table includes a virtual local area network index field. A decision making engine receives a VLAN ID from a packet or frame, converts it to a VLAN index and searches an address table for data forwarding information based on the generated VLAN index. The maximum number of VLANs supported is the VLAN capacity. The capacity is increased or decreased by changing the size of the VLAN field.

The U.S. Pat. No. 5,963,556, to Varghese et al, issued Oct. 5, 1999, divides a large extended LAN into multiple VLANs interconnected by routers by dividing bridge ports into virtual LANs.

The U.S. Pat. No. 6,035,105, to McCloghrie et al, issued Mar. 7, 2000, is related to the problem of VLAN identification within a packet when a frame is bridged or routed from a first type of VLAN to a second type of VLAN.

The U.S. Pat. No. 6,085,238, to Yuasa et al, routes data in a VLAN using predefined traffic bands or frequencies, with a routing table that links group IDs with specific frequencies.

The U.S. Patent Application Publication to Kloth, US2001/0005369 A1, published Jun. 28, 2001, uses the received frame type designation or receiving port in constructing a derived VLAN value.

The patent to Linden, WO01/93480 A1, published Dec. 6, 2001 discusses Wavelength Division Multiplexing (WDM) and the use of VLANs.

SUMMARY OF THE INVENTION

In an optical data transmission network that uses a VLAN ID in the MAC address of a packet, the present invention increases the maximum number of uniquely identified VLANs beyond the number of unique IDs provided with the VLAN ID alone, to a multiple of the number of wavelengths of a Wavelength Division Multiplexing (WDM) used by the optical data transmission network. The embodiment provides an optical VLAN number (OVLAN ID) that is a combination of the VLAN ID from the packet header and a wavelength ID that identifies a selected one of available wavelengths of a WDM transmission line.

One arrangement for generating frame forwarding decisions uses virtual local area network (VLAN) tagging, which facilitates the transmission of data to multiple stations by creating workgroups of users who may be physically separated from each other. As the number of stations in the network increases, the number of VLANs normally increases. Recently the VLAN has been employed in a metro area network (MAN), which also leads to an increase in the number of VLAN users in a network.

Therefore, there exists a need for a switching device and network management that supports a virtual local area network (VLAN) to increase the number of VLANs supported without changing the data packet header information and with minimal changes to the architecture of the switch.

The use of a VLAN ID is popular, but the VLAN ID usually takes the form of a field, for example a 12-bit field, in the MAC address of the packet header in accordance with the MAC frame defined by IEEE 802.3Q. In the example 12-bit field, there are 2 to the power of 12 or 4,096 unique identifiers. To obtain a larger number of VLANs, solutions such as increasing the VLAN ID field size would require a reconfiguration of the network and its equipment that would be complicated, expense and at the expense of other features.

These and other needs are addressed by the present invention, which increases the VLAN users in a single network without modification of the VLAN ID field and without changing the hardware of the network.

In the embodiment, a new Optical Virtual Local Area Identification (OVLAN ID) is defined as a combination of the known VLAN ID that is found in a field of a packet header or the MAC frame and an optical path ID that is dependent upon the wavelength of a WDM link. An Optical VLAN (OVLAN) conversion table stores data of the OVLAN ID, the VLAN ID and optical path ID, for an optical VLAN switching node.

The embodiment results in a known WDM optical network resource being simply and inexpensively modified to be able to handle a larger number of VLANs. Thereby, the efficiency of the network resource is improved. Advantageously, the MAC is not changed or modified, the maximum number of OVLANs that may be implemented increases in proportion to the number of wavelengths used in the WDM network, and there results an effective use of the available bandwidth, particularly in comparison with a known Multi-Protocol Label Switching (MPLS) network. While one aspect of the invention is to support a lager number of VLANs, as mentioned above, another aspect of the invention is to allow different VLAN domains to use the same VLAN ID, because in this invention a VLAN is identified by a combination of a VLAN ID and a wavelength.

A multi-port switch controls communication of data frames between stations. The switch includes a receive device for receiving data frames and an address table for storing VLAN information (VLAN index field). The switch also includes a control device (decision making engine) that receives information from a data frame, including a VLAN identifier, and searches the address table for data forwarding information. The internal decision making engine generates a VLAN index from the VLAN identifier and searches the address table for data forwarding information.

The present invention is described in the preferred embodiment and best mode of an optical virtual local area network, with the term local not being used in a restrictive physical sense, but in a logical sense meaning that to the user the OVLAN appears to be a LAN, as opposed to a metro area network (MAN) or wide area network (WAN) such as the Internet, due to priority access, even though the OVLAN may be physically implemented on one or more MAN or WAN.

Still other aspects, features and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 is an example of the forwarding table of the switch shown in FIG. 12; and FIG. 14 is another example of the forwarding table of the switch shown in FIG. 12.

FIG. 17 illustrates an exemplary forwarding table.

DETAILED DESCRIPTION OF THE PREFERRED AND ILLUSTRATIVE EMBODIMENTS

Figures 1, 10:
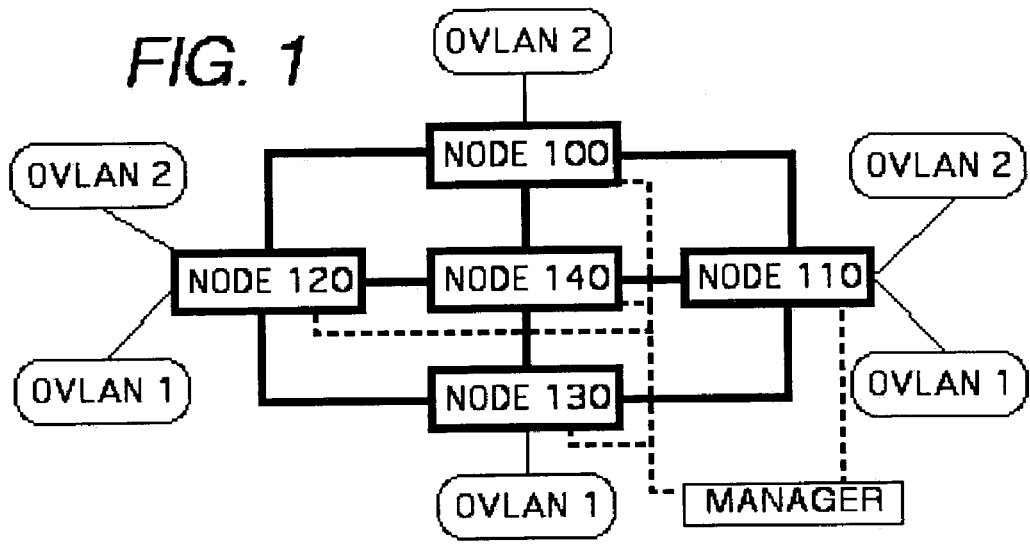
FIG. 1 describes one embodiment of a network having optical virtual local area networks (OVLANs) defined thereon, according to the present invention.
FIG. 10 is a representation of some of the contents of a forwarding database at the node, and more particularly OVLAN forwarding data in the form of the TABLE of FIG. 9.

A system, device, method, signal, media and software for implementing an optical virtual local area network (OVLAN) are described as an illustration and embodiments of the present invention and also as a description of the best mode presently known to the inventor for practicing the present invention.

The preferred embodiment solves the problems relating to the known VLAN ID having a fixed capacity, which may be exceeded at certain nodes.

In the following description, for the purposes of explanation, numerous specific details are set forth in order to provide a thorough understanding of the broader aspects of the present invention, as well as to appreciate the advantages of the specific details themselves according to the more narrow aspects of the present invention. It is apparent, however, to one skilled in the art, that the broader aspects of the present invention may be practiced without these specific details or with equivalents determined explicitly herein or with equivalents determined in accordance with the guidelines set forth herein. Well-known structures and devices are shown in block diagram form in order to avoid unnecessarily obscuring the present invention with unnecessary details. The drawing and description are illustrative and not restrictive.

In a VLAN, terminals have priority access clearance across the backbone of a network, so that they appear to be on the same segment of an enterprise (for example, corporate) level LAN. The VLAN is implemented in LAN switches and routers having a similar switching function, on the basis of a MAC or port address. Medium Access Control (MAC) is a sub-layer of a LAN. A MAC address, for example, may be a 48-bit code that is unique to each LAN. The known VLAN ID is a fixed length field of the MAC, and therefore the VLAN ID has a maximum capacity for identifying different VLANs. For example a VLAN ID field of 12-bits can only produce 4,096 different numbers, Increasing the size of the field raises a packet length problem.

Ethernet packet length is traditionally no longer than 1,514 bytes, including header and data fields. In generally, Ethernet equipment will discard a packet with more than 1,514 bytes. A known method used to increase VLAN capacity adds a new header onto the traditional Ethernet frame in order to increase the maximum VLAN user number. The disadvantage of the known method is that it changes the packet length, which makes it impossible to use general Ethernet equipment.

The present invention relates to an new "optical VLAN" (OVLAN), which is a virtual network for LAN users based on a new optical VLAN ID (OVLAN ID). The OVLAN ID is defined as the combination of both the known VLAN tag (VLAN ID) in the Ethernet frame and a newly defined optical Path ID (or Wavelength Path ID, WL ID) that is not a part of the packet.

FIG. 1 shows an example of a network configuration according to an embodiment of the present invention. The optical VLAN system includes a number of OVLAN users and WDM links between network nodes to form a optical virtual local area networks (OVLANs). Each link may have more than one optical path, each defined by a unique wavelength on an optical fiber, and each path carries Ethernet packets/frames between two nodes. The illustrated three OVLAN 1 users, for example terminals or sub-nets, communicate sharing wavelengths with three OVLAN 2 users. The WDM network has the switching nodes NONE 100, NODE 110, NODE 120, NODE 130 and NODE 140, which are connected by links as shown in bold solid lines.

In FIG. 1, by way of an example of the embodiment, OVLAN 1 users have three networks or terminals in SF on the West Coast of the US (OVLAN 1) connected to NODE 120, in NY on the East Coast of the US (OVLAN 1) connected to NODE 130, and in Dallas, Tex. (OVLAN 1) connected to NODE 110. The OVLAN 1 service is provided by network service providers. The service providers logically connect these three local networks or terminals (OVLAN 1). Also, OVLAN 2 users have three networks or terminals in LA on the West Coast of the US (OVLAN 2) connected to NODE 120, in the DC on the East Coast of the US (OVLAN 2) connected to NODE 100, and in Fort Worth, Tex. (OVLAN 2) connected to NODE 110. The service providers logically connect these three local networks or terminals (OVLAN 2). The logical connections are to be distinguished from physical connections.

The embodiment provides for a number of different optical VLANs to share a network resource, that is, the to share the same VLAN tag or VLAN ID, by distinguishing the different OVLANs with the additional use of the link carrier wavelength. Therefore, for an example of a 12-bit VLAN tag providing 4,096 different identities, an additional 4,096 identities may be provided for each wavelength used in excess of one in a WDM system. Thus the efficiency of the network resource (VLAN ID) and the switching device is increased. The increase in the VLAN capacity is obtained by modifying only the software of an existing hardware system, because the OVLAN is based on a logical connection instead of a physical connection. Thus the VLAN capacity may be multiplied at a low cost and with ease of modification.

A network manager, administrator or operator, etc. (MANAGER) manages and sets up which customer has which VLAN, assigns VLAN tags to different customers and sets all affected nodes of the general purpose network with the corresponding information, which information is thereby set in the databases of the affected nodes.

Figure 15:
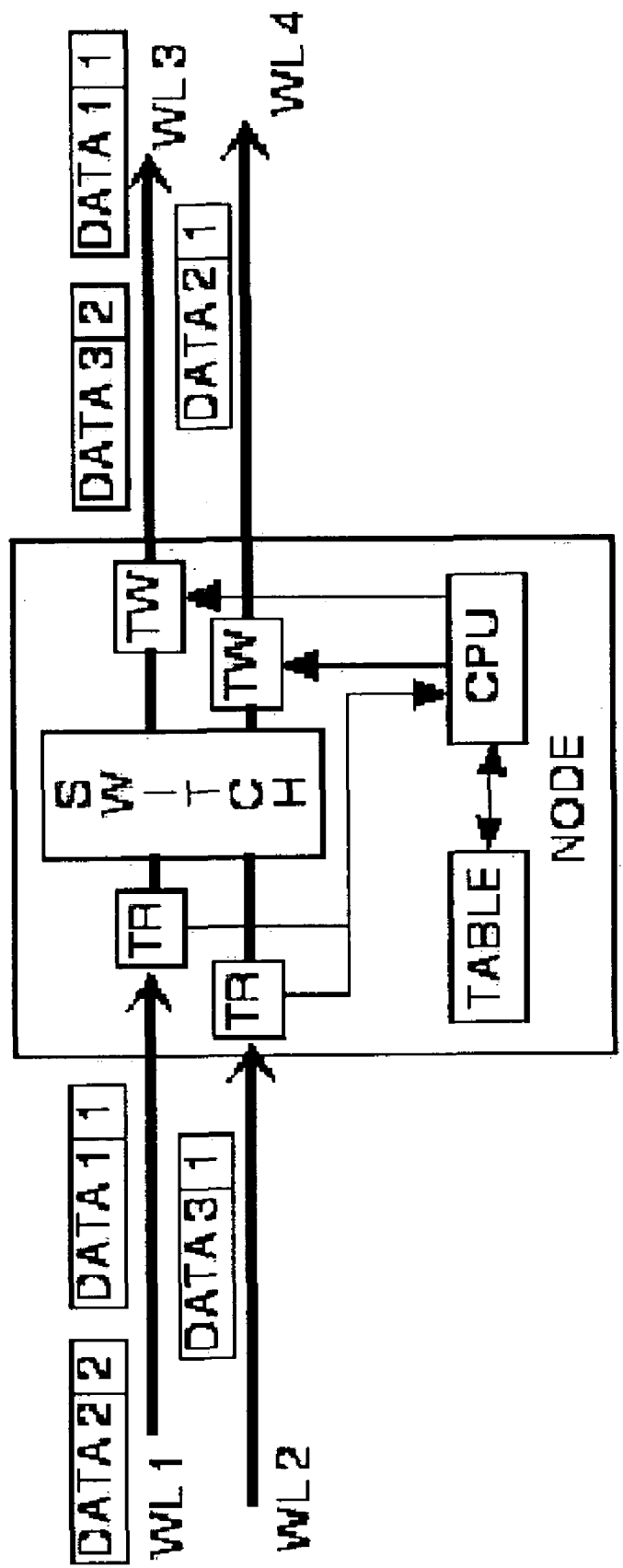
FIG. 15 illustrates functions of typical data of input and output packets for optical VLANs.

The functions of typical data of input and output packets for optical VLANs will be briefly mentioned with FIG. 15. A multi-port switch (SWITCH) switches the frames based on the forwarding information. The switch includes receive devices TR for receiving data frames and an address table (TABLE) for storing source addresses, destination addresses and VLAN information (VLAN index field). The switch also includes a control device or decision-making engine (a computer having the CPU), which receives information from a data frame, including a VLAN identifier (VLAN ID), and then searches the address table for data forwarding information. The internal decision making engine generates a VLAN index from the VLAN identifier and searches the address table for data forwarding information.

The illustrated node is shown with respect to packet switching for two input ports on the left, respectively for first and second wavelength carriers, WL 1 and WL 2, and two outlet ports for two wavelength carriers WL 3 and WL 4 on the right in the drawing. The node preferably operates in both directions (bi-directional) although only one direction is provided for illustrative simplicity, and the opposite direction would be a mirror image of the functions. Although not shown in detail, it is preferable that the node has more than two input wavelengths and more than two output wavelengths to correspondingly increase capacity, and, if so, the illustrated functions would be merely duplicated for the additional wavelengths. The four different wavelengths for the switch are merely a part of the example, and a wavelength on one side may be repeated on the other side, for example the illustrated wavelength WL4 may be the same as WL 1.

The optical VLAN node (OVLAN) has a tag reading function (TR) for each inlet port, a tag writing function (TW) for each outlet port, a packet switching function (SWITCH), one or more CPUs interfacing with the TR, TW functions and the switch, and an optical VLAN table (TABLE) that is part of a storage (more generally, a forwarding information database). The node may be a LAN switch that reads the Layer 2 (L2) header of incoming packets or a router that has a function to read the L2 header.

The present embodiment envisions and covers the implementation of the VLAN ID in other levels, in other frames and in other types of data units. The structure of a MAC frame in the L2 header of a packet is well known and in the specific example herein the VLAN ID or VLAN tag is a 12-bit field in the MAC.

FIG. 10 shows a TABLE, in detail, with example information. Tag reading and tag writing functions, TR and TW, read and write the VLAN tag ID in the MAC Ethernet frame (Layer 2 header) of input and output packets or frames, respectively, in a well known manner that does not need any further disclosure to those having ordinary skill in this art.

The packet switching function, SWITCH, operates in a well-known manner to electrically, optically or electro-optically switch a received packet from an input port to a selected output port according to OVLAN table information, under the control of the connected CPU. Although not specifically shown, the CPU is operatively connected to storage that includes the TABLE, operating system and software for the described functions. The CPU is also connected to other devices (not shown for illustrative simplicity) to provide a general-purpose computer that together with the software disclosed herein becomes a special purpose computer to provide the new OVLAN functionality disclosed herein.

The computer typically includes a bus or other communication for communicating information, a processor (CPU) coupled to the bus for processing information received as commands from a main memory, a random access memory (RAM) or other dynamic storage device coupled to the bus for storing information (TABLE) and instructions (implementing the method of FIGS. 2 and 11) to be executed by the processor. The main memory can also be used for storing temporary variables or other intermediate information during execution of instructions by the processor. The computer system typically further includes a read only memory (ROM) or other static storage device coupled to the bus for storing static information and instructions for the processor, for example during start-up of reboot. The storage device may further include a magnetic disk or optical disk, which typically is coupled to the bus for permanently storing information and instructions.

The optical VLAN table, of FIG. 10, stores information on the relationship between the optical VLAN ID (OVLAN ID), optical path ID (or wavelength ID, WL ID) and VLAN ID. The SWITCH is preferably a conventional, Layer 2 type of switch or a LAN switch layer 3 type of switch, or an IP switch, or a LAN switch, or a layer 3 type of router with a switching function.

With respect to the first row of the TABLE of FIG. 10, as an example, the data 1 in the MAC frame (Ethernet frame) with VLAN tag 1 on optical path 1 (WL 1) goes into input port 1. Then the tag reading, TR, derives the VLAN ID as 1; the computer then controls the switch (here a 2×2 cross bar switch) so that the packet is output through port 3 onto optical path 3 (WL 3), with VLAN tag 1 being kept. In FIG. 10, the notation for each of the VLAN IN and VLAN OUT is in the form of VLAN ID (VLAN tag) @ WL ID (path).

With respect to the third row of the TABLE of FIG. 10, data 3 in the MAC frame with VLAN tag 1 on optical path 2 (WL 2) goes into input port 2, where tag reading, TR, derives the VLAN ID as 1; the computer then controls the switch so that the packet is output through port 3 onto optical path 3 (WL 3), with VLAN tag 1 being converted to VLAN tag 2, because VLAN tag 1 is already used on optical path 3 (seen from the first row of the TABLE of FIG. 10). The TABLE is the database forwarding information for Data 3.

Data 2 in the MAC frame with VLAN tag 2 on optical path 1 goes into input port 1, where tag reading, TR, derives the VLAN ID as 2; the computer then controls the switch so that the packet is output through port 4 onto optical path 4 (WL 4), with VLAN tag 2 being converted to VLAN tag 1 (alternatively, in this case the VLAN tag could be 2).

Figure 16:
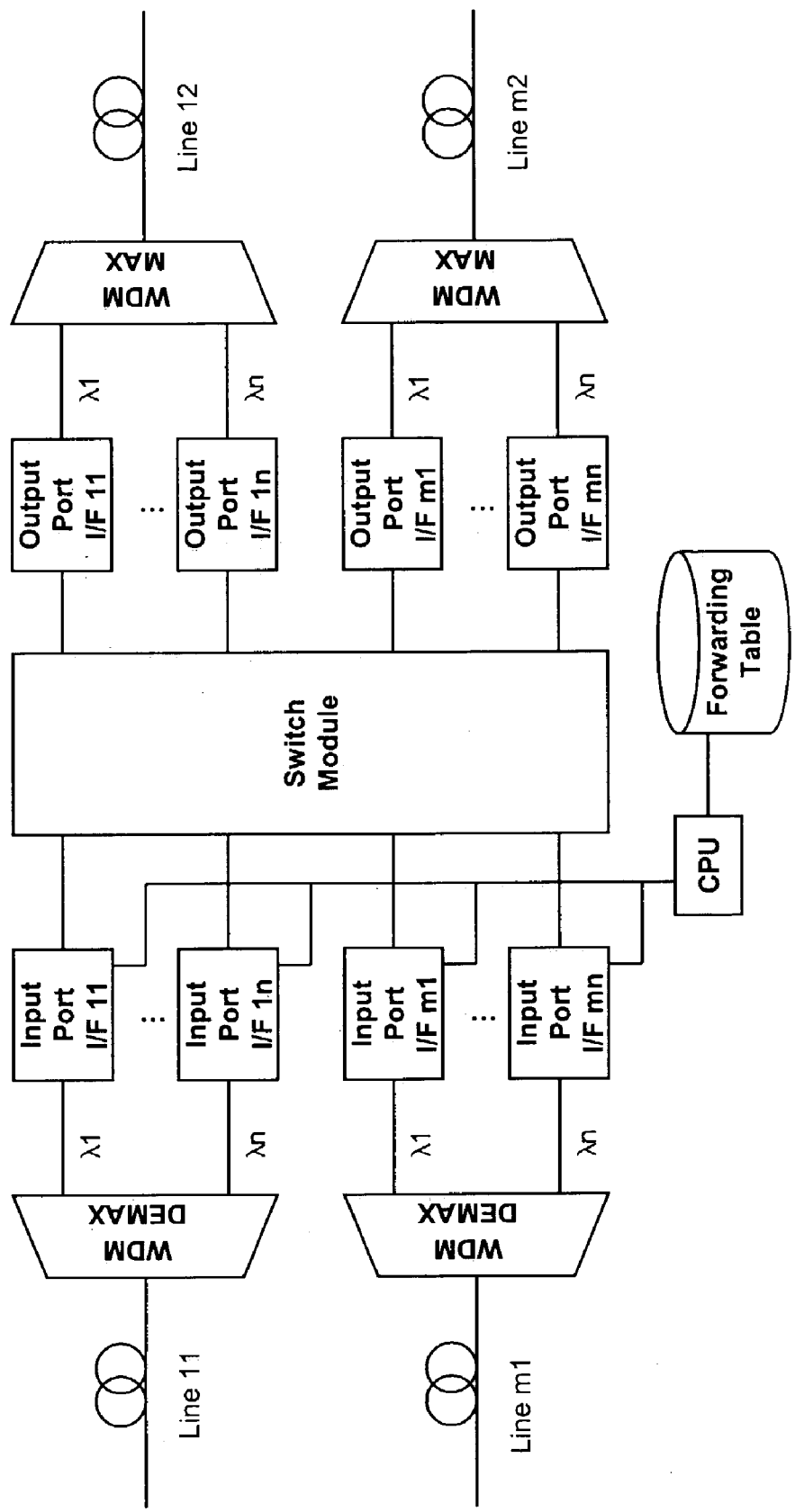
FIG. 16 illustrates nodes in a network including a WDM demultiplexer and a WDM multiplexer.
Figure 18:
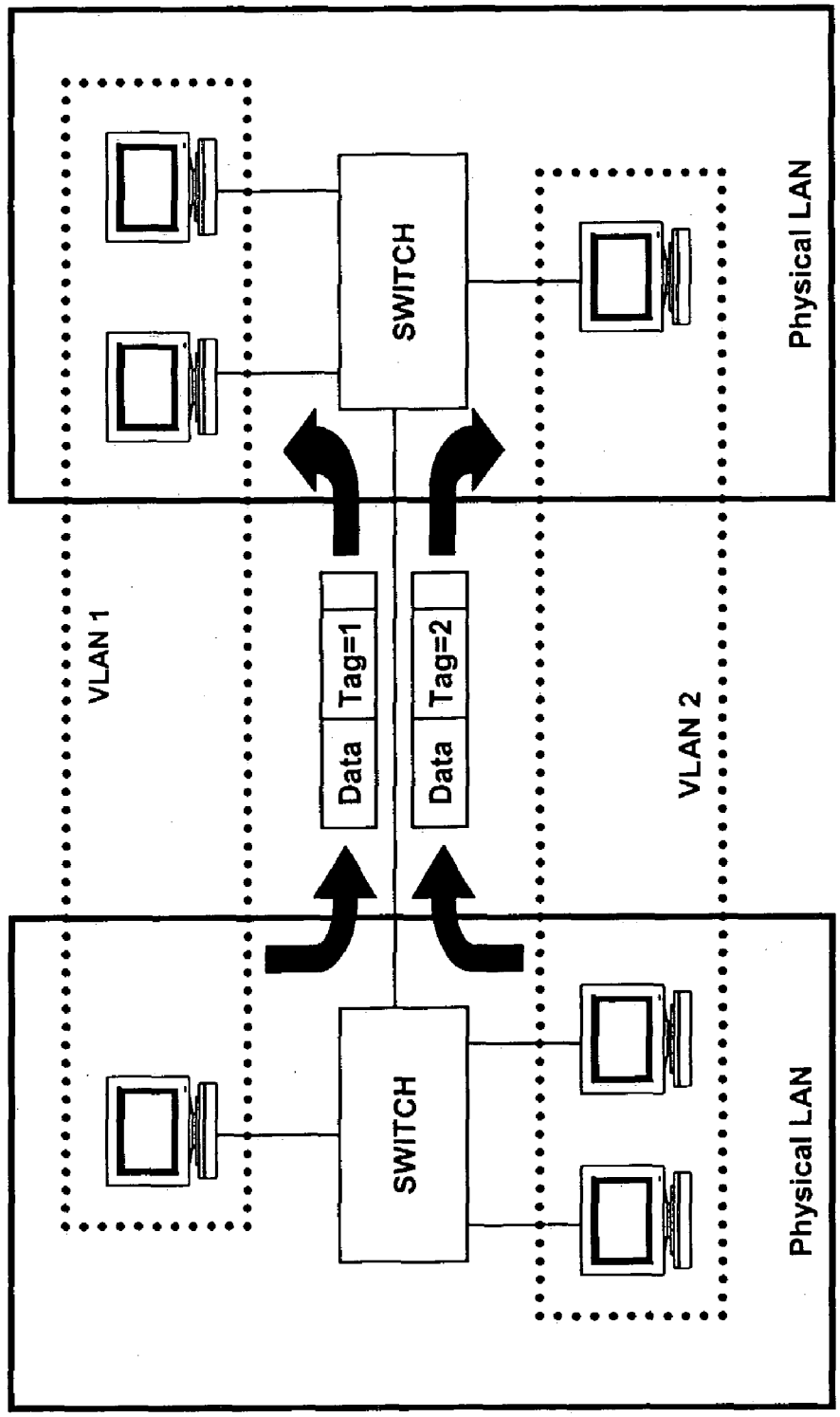
FIG. 18 depicts an exemplary network configuration with VLAN ID.
Figure 19:
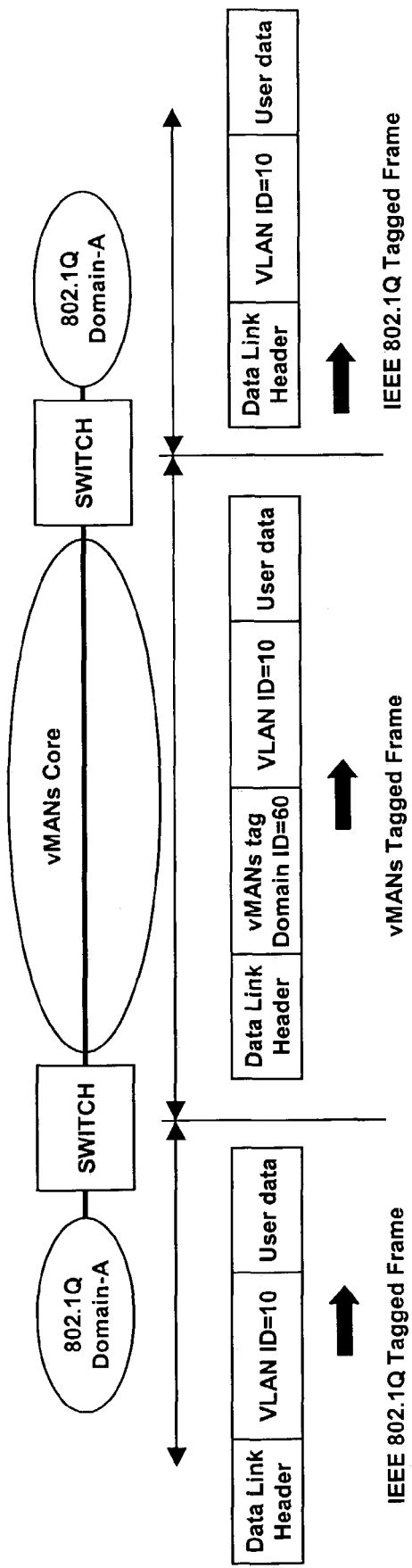
FIG. 19 illustrates an exemplary vMAN scheme.

FIG. 16 shows an example of the nodes. WDM DEMAX and SDEM MAX are respectively a WDM demultiplexer and a WDM multiplexer. Input Port I/F includes at least an O/E (Optical/Electrical) converter and a MAC processing unit. Output Port I/F includes at least a MAC processing unit and an E/O (Electrical/Optical) converter. A Switch module is an electrical devices such as a crossbar switch. Input Port I/F retrieves the VLAN ID from an input MAC frame and sends the VLAN ID to the CPU. Referring to a forwarding table, the CPU decides an output port where an input frame is output. An input port I/F replaces a VLAN ID associated with an input MAC frame with a VLAN ID decided by the CPU and transmits the frame with the new VLAN ID to the switch module. The switch module outputs the input frame to the output port as controlled by the CPU. An output port I/F performs MAC processing and E/O conversion processing of a frame received from the switch.

FIG. 17 shows an example of the forwarding table. For instance, if a frame with VLAN ID 1 is input into Port I/F 11, then Output Port I/F 21 is the port where the input frame is output and the VLAN ID is replaced with VLAN ID 2.

Figure 3:
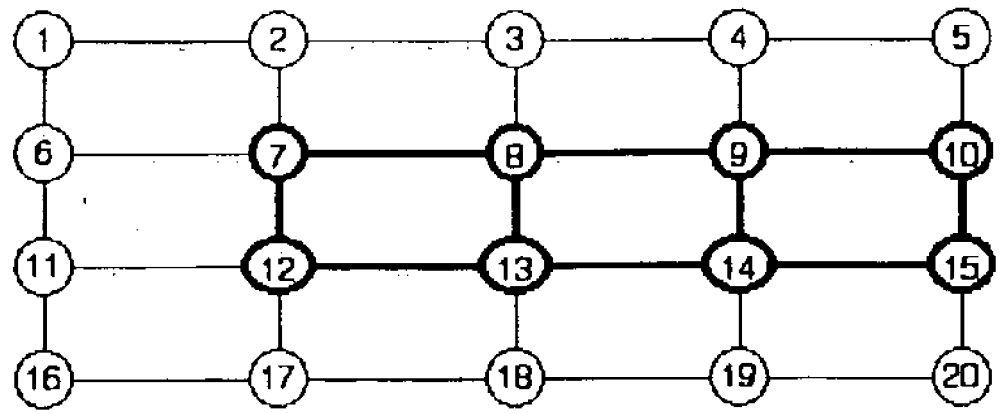
FIG. 3 is a representation of an example first virtual local area network (VLAN) connecting nodes 7-10 and 12-15 of the network generally shown in FIG. 1.
Figure 4:
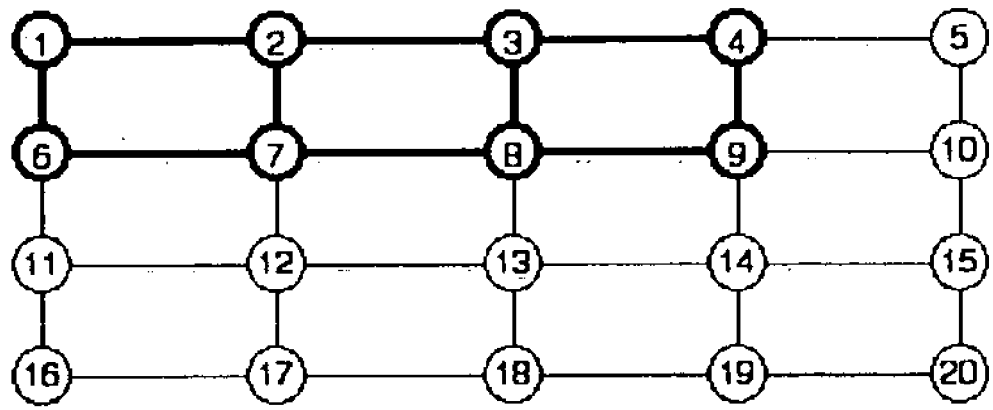
FIG. 4 is a representation of an example second virtual local area network (VLAN) connecting nodes 1-4 and 6-9 of the network generally shown in FIG. 1.
Figure 5:
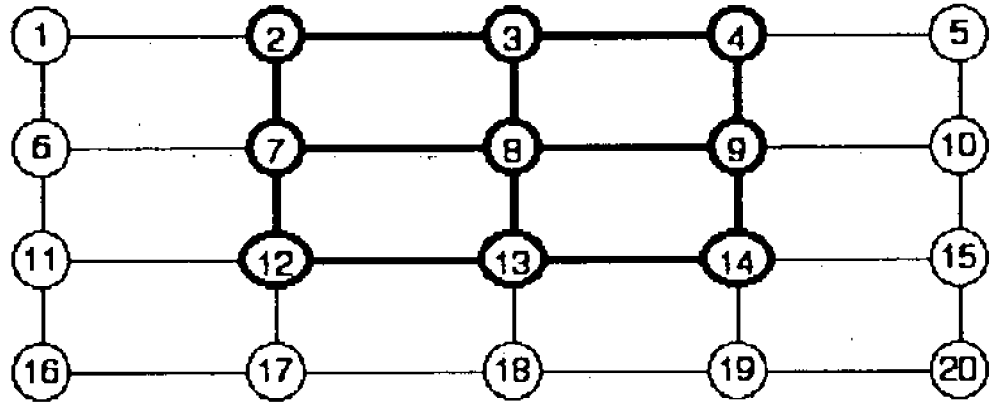
FIG. 5 is a representation of an example third virtual local area network (VLAN) connecting nodes 2-4, 7-9, and 12-14 of the network generally shown in FIG. 1.

FIGS. 3 to 5 respectively show a configuration of how an optical VLAN can be built by a network provider. In this example there are three customers with three different VLANs, respectively, which VLANs are sharing a single network. The network service provider offers optical VLAN service in a network in the following way.

The present embodiment uses an OVLAN ID, which in the embodiment has been described as a combination of both the VLAN ID and the carrier wavelength, because reference to different wavelengths is easily understood. However, the embodiment is useful with other path identifiers than the wavelength, for example, the input port number or path tag.

When each port has a separate wavelength, the port identification is effectively also wavelength identification. Wavelength ID as the path identification is particularly useful when one port may have many carrier wavelengths. The VLAN ID is in the packet header or otherwise carried by the frame, while the path ID is determined at the switching function node of the network.

An example will be illustrated and described with respect to FIGS. 3 to 8. In these figures, a network of twenty nodes is illustrated, with all of some of the nodes having a switching function. The nodes are respectively numbered only for reference purposes herein. In FIG. 3, a physical layout of the network, a first customer has a VLAN 1 set up interconnecting nodes 7 to 10 and nodes 12 to 15. In FIG. 4, a physical layout of the same network, a second customer has a VLAN 2 set up interconnecting nodes 1 to 4 and nodes 6 to 9. In FIG. 5, a third customer has a VLAN 3 set up interconnecting nodes 2 to 4, nodes 7 to 9 and nodes 12 to 14. In FIGS. 3, 4 and 5, the VLAN 1, the VLAN 2 and the VLAN 3 are respectively shown in heavy lines to include the nodes and the links between such nodes.

All of the links in the illustrative VLANs are optical transmission lines with WDM. Some of the other nodes, for example nodes 5, 11 and 16 to 20 may be other than optical links with WDM. Further, some of the nodes may be bridges or gateways between different network segments or networks involving one or more of the illustrated nodes. That is, within one VLAN, a plurality of physical LANS, WANS, etc. may be present. For example, the network of FIGS. 3 to 5 may be a LAN, a WAN, or the Internet. If one of the nodes of a VLAN does not employ different wavelengths, then the node may employ another link.

In the example, the VLAN ID is defined by a 12-bit field in the MAC frame of the packet header and accordingly may identify a maximum of 4,096 unique VLANs. Thus, if a particular node handles more than 4,096 different VLANs for a specific link, the use of only the conventional VLAN ID would be insufficient.

When a packet of the VLAN 1 of FIG. 3 arrives at node 8 for forwarding on the link between nodes 8 and 9, it may be that at least 4,096 different VLANs have already been defined at node 8. The present embodiment is able to forward the new packet with a unique OVLAN ID. The OVLAN ID may use a wavelength not used by a different VLAN that happens to have the same VLAN ID. Node makes the decision that different VLANs are involved even though the new packet has the same VLAN ID as a prior packet, because the new packet arrived at a different input port or wavelength. By using the OVLAN ID, with three wavelengths of WDM and a 12-bit VLAN ID, a maximum of 3×4,096, or 12,288, OVLAN IDs are defined. Thereby there is an increase of 300% in VLAN capacity, for the example, without modifying the hardware or physical connections.

Each optical path can use 4,096 different VLAN tags with a 12-bit VLAN ID in the packet header. If the VLAN tag is consumed for the link, the link may have a further identification of wavelength carrier to effectively have more optical VLAN IDs. According to the embodiment, an OVLAN is defined at each node (FIG. 2) or alternatively at only the overloaded nodes (FIG. 11) by both the VLAN ID and one wavelength out of the plural carrier wavelengths of the WDM forwarding link.

Figure 6:
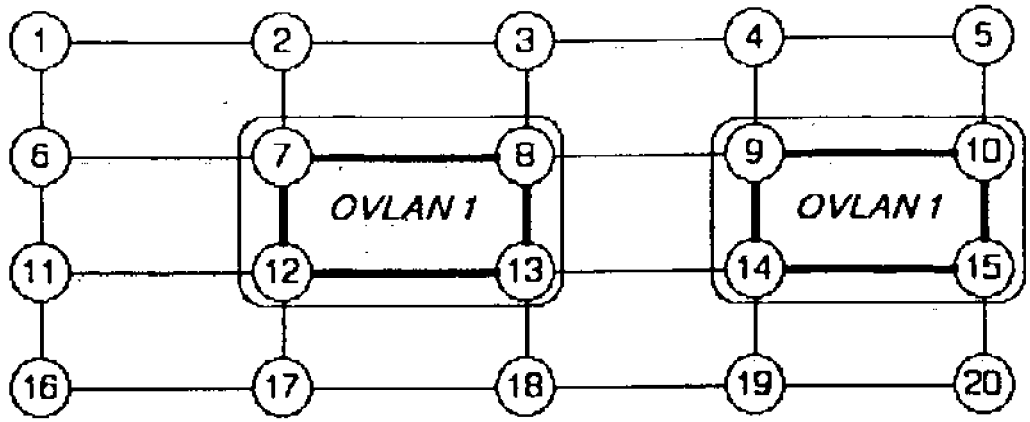
FIG. 6 is a representation of two segments of an optical virtual local area network (OVLAN 1) for partially implementing the first VLAN shown in FIG. 3, with respect to a first wavelength of a wave division multiplexing (WDM)
Figure 7:
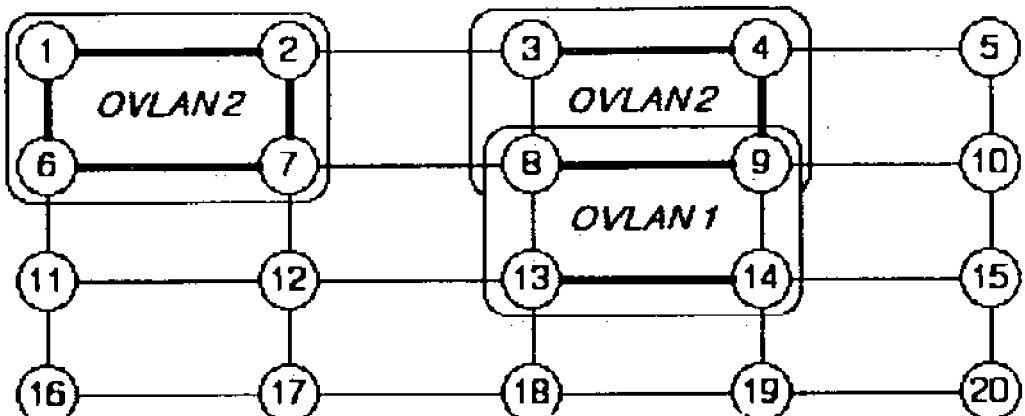
FIG. 7 is a representation of two segments of an optical virtual local area network (OVLAN 2) constructed for partially implementing the second VLAN shown in FIG. 4, and of one segment of the optical virtual local area network (OVLAN 1) constructed for completing implementation of the first VLAN shown in FIG. 3, all with respect to a second wavelength of a WDM.
Figure 8:
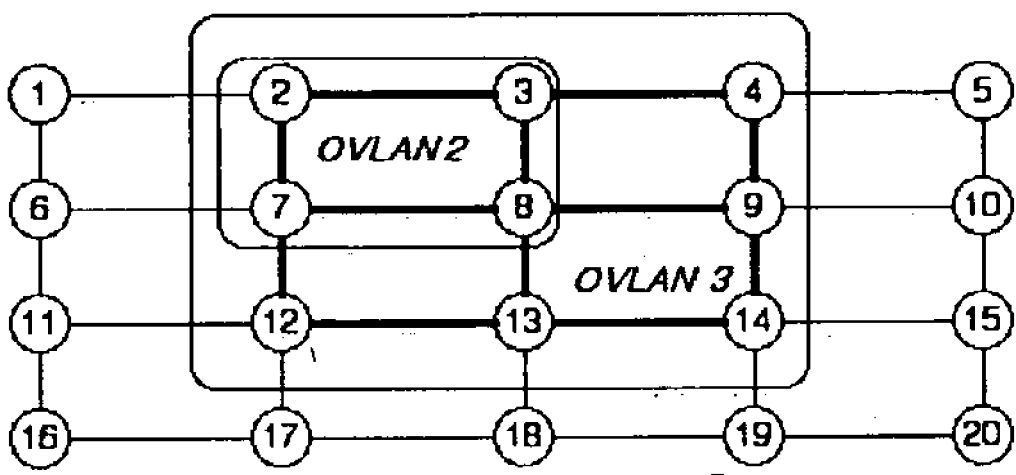
FIG. 8 is a representation of one segment of the optical virtual local area network (OVLAN 2) constructed for completing implementation of the second VLAN shown in FIG. 4, and of the optical virtual local area network (OVLAN 3) constructed for completely implementing the third VLAN shown in FIG. 5, all with respect to a third wavelength of a WDM.

The network with respect to a first wavelength is shown in FIG. 6; the same network with respect to a second wavelength is shown in FIG. 7; and the same network with respect to a third wavelength is shown in FIG. 8. The links in FIGS. 6-8 are bi-directional, and therefore, for example, link notation 7-8 is the same as link notation 8-7.

Accordingly, OVLAN 1 includes the following links: 7-8, 7-12, 8-13, 13-12, 9-10, 9-14, 14-15 and 15-10 with wavelength 1 (WL 1) as shown in FIG. 6; and 8-9 and 13-14 with wavelength 2 (WL 2) as shown in FIG. 7.

Similarly, OVLAN 2 includes the following links: 1-2, 1-6, 6-7, 2-7, 3-4, 4-9 and 9-8 with wavelength 2 (WL 2) as shown in FIG. 7; and 2-3, 7-8 and 8-3 with wavelength 3 (WL 3) as shown in FIG. 8.

Finally, OVLAN 3 includes the following links: 2-3, 3-4, 2-7, 3-8, 4-9, 7-8, 8-9, 7-12, 8-13, 9-14, 12-13 and 13-14 with wavelength 3 (WL 3) as shown in FIG. 8.

From comparing FIGS. 6 to 8 with respect to OVLAN 2 and OVLAN 3, the following is noted. Links 2-3, 3-8 and 7-8 are shared by OVLAN 2 and OVLAN 3, with the same wavelength. On these links, OVLAN 2 and OVLAN 3 would require a different VLAN ID. However, although OVLAN 2 and OVLAN 3 share links 2-7, 3-4, 4-9 and 9-8, OVLAN 2 and OVLAN 3 are assigned different wavelengths, so that OVLAN 2 and OVLAN 3 may be assigned the same or different VLAN IDs.

Figure 2:
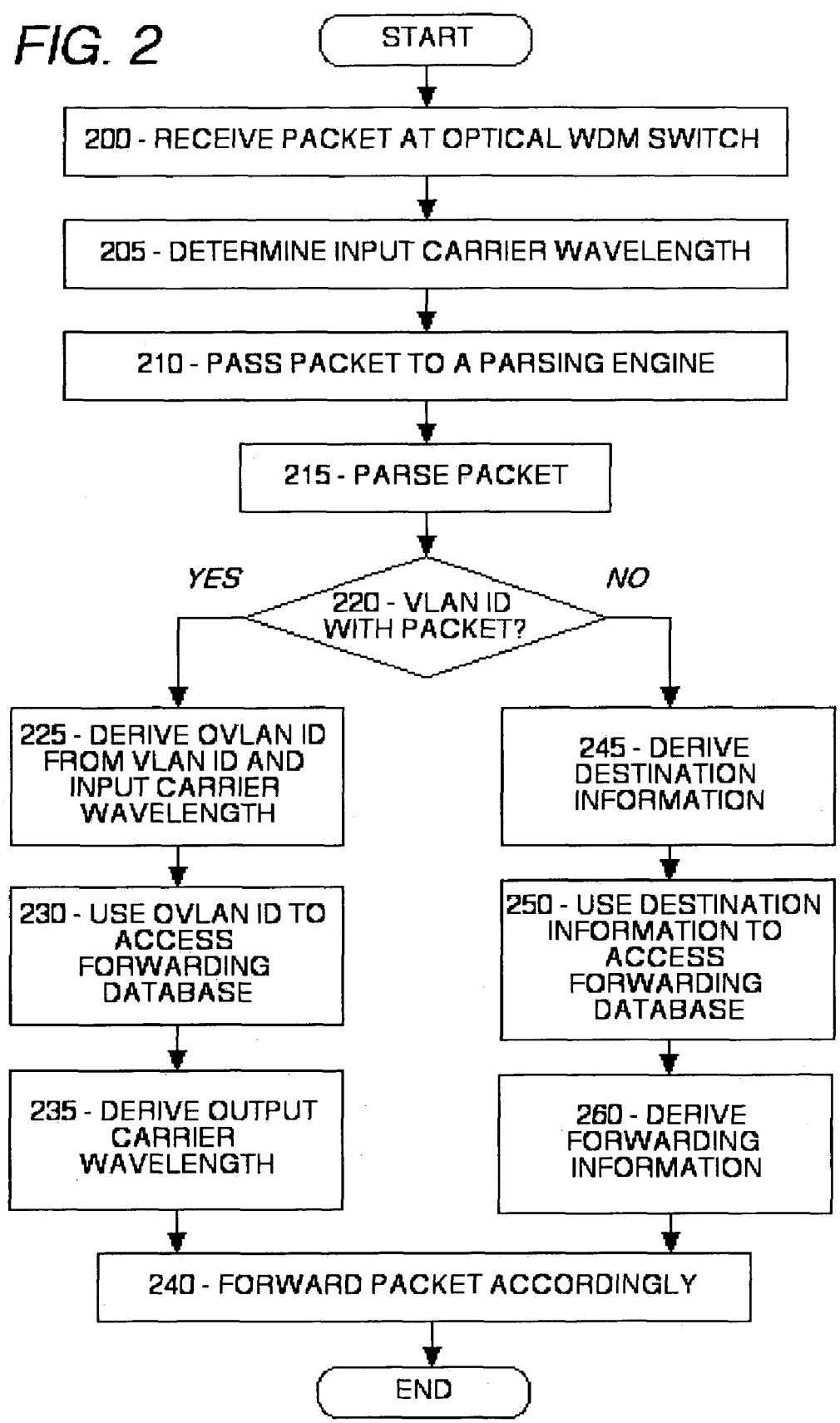
FIG. 2 is a flow chart of the operation of the network according to FIG. 1, particularly with respect to a representative one of the nodes, with all VLAN identified packets or frames being processed with respect to an OVLAN ID.

FIG. 2 is a flow chart of the operation of the network according to FIG. 1, particularly with respect to a representative one of the nodes, with all VLAN identified packets or frames being processed with respect to an OVLAN ID Step 200, FIG. 2: a packet is received at a node of the network, which node is of a type having WDM. For example, the packet may be from OVLAN 2 and received at node 120 of FIG. 1.

Step 205, FIG. 2: The computer at the node 120, including the CPU, receives a signal from the tag reading function device TR that identifies the packet as being one received at the port having the first wavelength, WL 1, as the input carrier wavelength, when each input port is assigned a separate wavelength. When an input port has more than one wavelength, known devices easily distinguish the carrier wavelength and inform the computer.

Step 210, FIG. 2: the received packet is passed to a parsing engine, which is well known in the art and may be the computer programmed to parse the packet in a known manner.

Step 215, FIG. 2: then the header of the received packet is parsed from the data and the OVLAN ID is parsed from the header, particularly from the MAC.

Step 220, FIG. 2: a decision is made as to whether or not the OVLAN ID is valid, which may be merely a recognition as to whether it is present. When the decision process reaches an affirmative result, processing passes to step 225, and if not then the processing passes to step 245.

Steps 245, 250, 260 and 240, FIG. 2: these steps involve conventional processing to derive the destination information from the parsed packet header, to use the derived destination information to access a conventional database, and to thereby derive the forwarding information that is set in the packet header, if needed. Then the packet is forwarded accordingly in step 240.

Step 225, FIG. 2: the OVLAN ID is derived from both the VLAN ID that was parsed in step in 215 and found to exist in step 220 and from the input carrier wavelength WL 1 that was determined in step 205.

Step 230, FIG. 2: the OVLAN ID that was derived in step 225 is used to access the forwarding database, for example, including the table of FIG. 10.

Step 235, FIG. 2: with the information from the forwarding database obtained in step 230, the output carrier wavelength and port are derived.

Step 240, FIG. 2: appropriate information is set in the packet header as needed, which is conventional in the prior art. Then the packet is forwarded accordingly from the port and on the carrier wavelength derived in step 235. Thereby, the output carrier wavelength becomes the input carrier wavelength at the next switching node for step 205 of the process run on the next switching node.

While the above-mentioned specific OVLAN links are preferably two-way communication links, the present embodiment may be practiced with the one-way links. One link may involve wavelength 1 in one direction and wavelength 3 in the opposite direction, for example.

Figure 11:
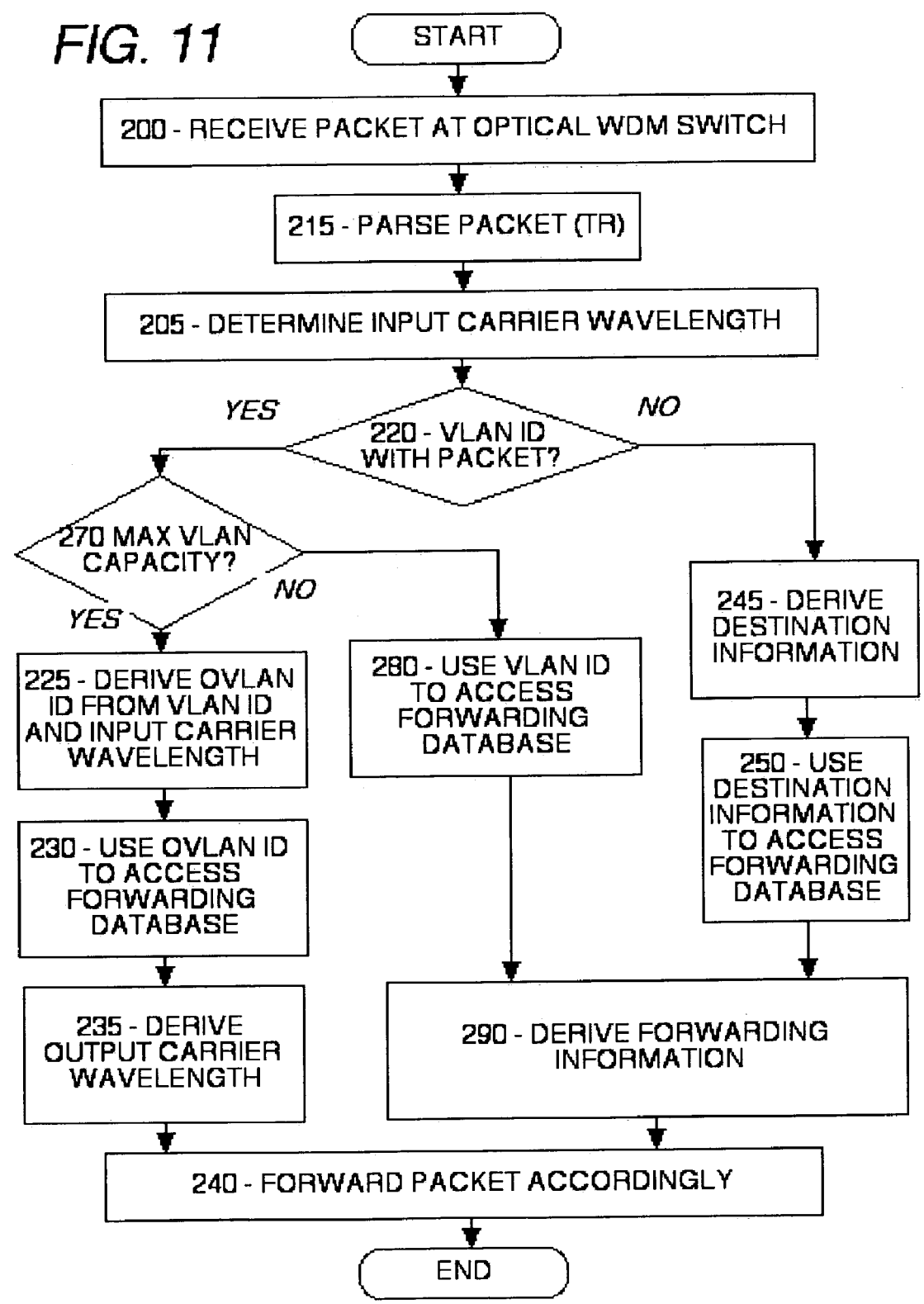
FIG. 11 is a flow chart of the operation of the network according to FIG. 1, particularly with respect to a representative one of the nodes, with VLAN identified packets or frames only being processed with respect to an OVLAN ID when the capacity of the VLAN ID for solely identifying VLANs has been exceeded, as an alternative operation to that of FIG. 2.

FIG. 11 is a flow chart of an alternate operation of the network according to FIG. 1, which differs from the method of FIG. 2, in that VLAN identified packets or frames are processed with respect to an OVLAN ID, as in FIG. 2, only when the capacity of the VLAN ID for solely identifying VLANs has been exceeded.

Steps 200, 215, 205, 220, 245, 250, 260 and 240, FIG. 11: these steps are the same as the correspondingly numbered steps in the method of FIG. 2.

It is seen that steps not dependent upon their order may be reversed as has been done with steps 205 and 215, where their order of presentation in FIGS. 2 and 11 has been changed to illustrate this point. Also some steps may be combined or split without departing from the embodiment; explicit step 210 of FIG. 2 is inherent in either step 200 or step 215 of FIG. 11 to illustrate this point. Furthermore, other steps may be added as desired, which is illustrated by the extra steps of FIG. 11 as compared to FIG. 2.

Step 270, FIG. 11: When the received packet has a valid VLAN ID, as determined in step 220, the node database is examined to determine if the maximum VLAN ID capacity has been reached, which might be a comparison to 100% of the possible number of different VLAN numbers or some lower threshold value, such as 80% of that number. As mentioned previously, the possible number of different VLAN IDs is a function of the VLAN tag field in the MAC, for example; when the VLAN ID field is 12-bits, then the possible number of different VLAN numbers is 4,096.

Steps 225, 230, 235 and 240, FIG. 11: these steps are the same as the corresponding steps of FIG. 2, and are reached when the capacity of the VLAN ID has been reached as determined by step 270.

Step 280, FIG. 11: When the capacity of the VLAN ID has not been reached as determined by step 270, then the VLAN ID, without wavelength ID, is used to access the forwarding database as is well known in the prior art, for example.

Step 290, FIG. 11: The VLAN ID is used to derive the forwarding information from the database, as is well known in the prior art, for example.

Step 240, FIG. 11: appropriate information is set in the packet header as needed, which is conventional in the prior art. Then the packet is forwarded accordingly from the port derived in step 290.

Computer readable media to carry code for implementing the methods refers to any medium that participates in providing code that is executable to function according to the invention; for example to be executed by the CPU of FIG. 1. Examples include non-volatile media, volatile media and transmission media. Non-volatile media such as storage device including the TABLE includes, for example: optical or magnetic flexible discs or tapes and hard disks, and more specifically CD-ROM, CDRW and DVD; and punch cards, paper tape, optical mark sheets or any other physical medium with patterns of holes. Volatile media includes the main memory as RAM. In general computer readable media as used herein includes any physical fixation, temporary or more permanent, from which a computer can read code.

Transmission lines to carry the signal for implementing the present invention in a switching device of the embodiments include coaxial cables, copper wire, wireless links and fiber optics, which may send acoustic, optical or electromagnetic waves, such as those generated during radio frequency (RF), optical and infrared (IR) data communications.

Figure 12:
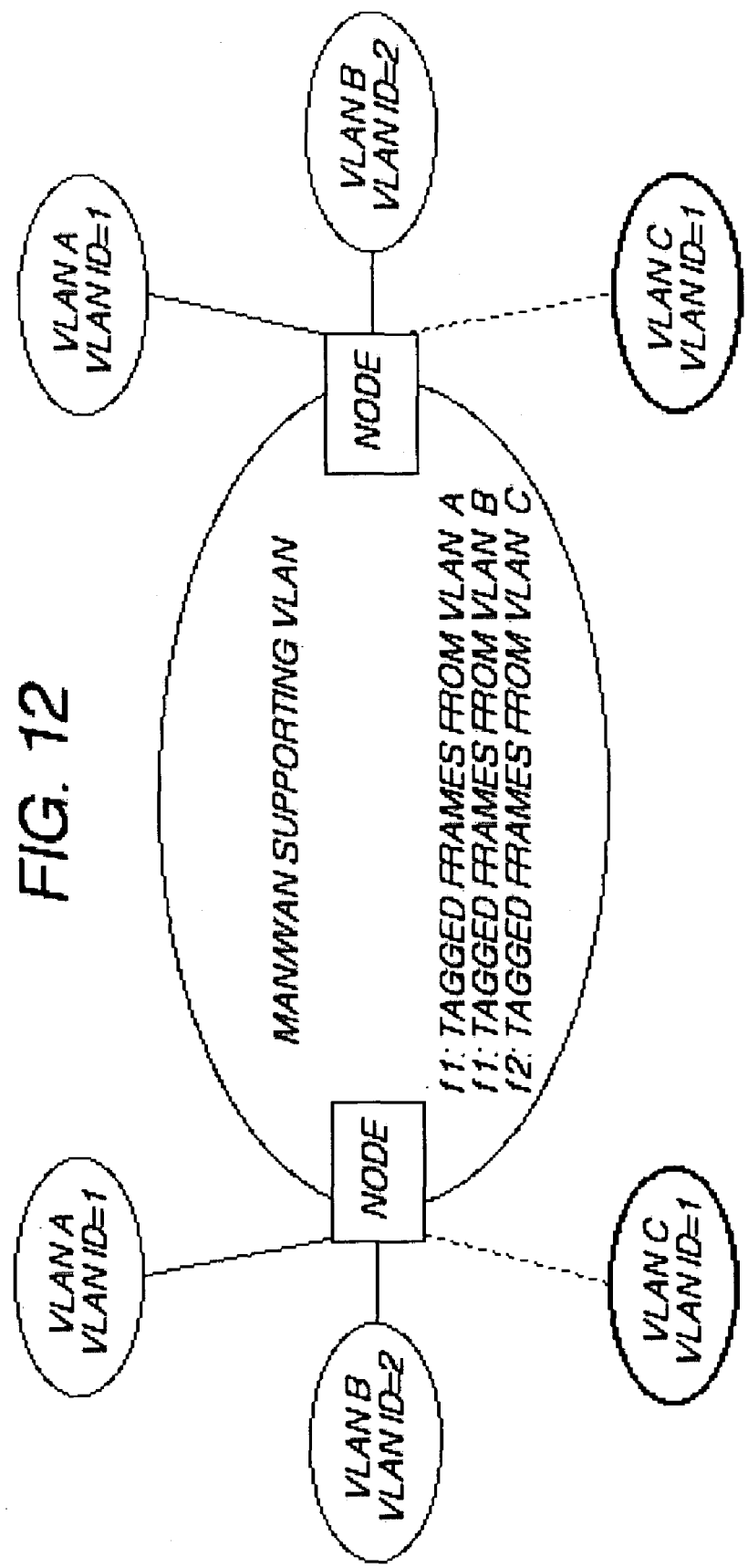
FIG. 12 shows a network having optical virtual local area networks (OVLANs) defined thereon according to another embodiment.

In the FIGS. 12 to 14 embodiment, the lines are optical fibers connecting WDM DEMAX (WDM demultiplexer) modules, with at least one exemplary switch module being an electrical switch module, for example a crossbar switch, as previously described. Input Ports have at least one O/E (Optical/Electrical) converter and at least one MAC processing unit. The input port reads the VLAN ID, gets a VLAN ID for an outgoing frame, and rewrites the VLAN ID. The output Port has at least MAC processing unit and at least one E/O converter.

When a network administrator provides VLAN services to a new VLAN user, for example VLAN C, he or she selects a path. Assume, as shown in FIG. 12, that there are two VLAN users, VLAN A (VLAN ID=1) and VLAN B (VLAN ID=2) on the path, and tagged frames from VLAN A and VLAN B are transmitted over same wavelength f1. In this case, the administrator chose a wavelength not used for VLAN ID=1, for example f2, for VLAN C. One exemplary way to do this is to use the table shown in FIG. 13. By doing so, it is not necessary to replace the VLAN ID of the tagged frame from VLAN C to a different VLAN ID in the network. Therefore, the nodes do not need a tag rewriting function. An exemplary forwarding table is shown in FIG. 14. The nodes do not need a tag rewriting function. Unlike the forwarding table shown in FIG. 17, the forwarding table shown in FIG. 14 does not have a VLAN ID field for output frames.

The network embodied in FIGS. 12 to 14 can support a less number of VLANs than the network embodied in FIGS. 1 to 11; yet, because in the former embodiment, rewriting VLAN ID is not necessary, existing LAN switches are available. Also, because in the former embodiment, VLAN ID management on link-by-link basis is not needed, the load placed on the network administrator is reduced.

Accordingly, in a network that includes packet switching and WDM, the capacity for optical VLANs is increased above that provided by the use of only a VLAN ID in the packet header.

Figure 9:
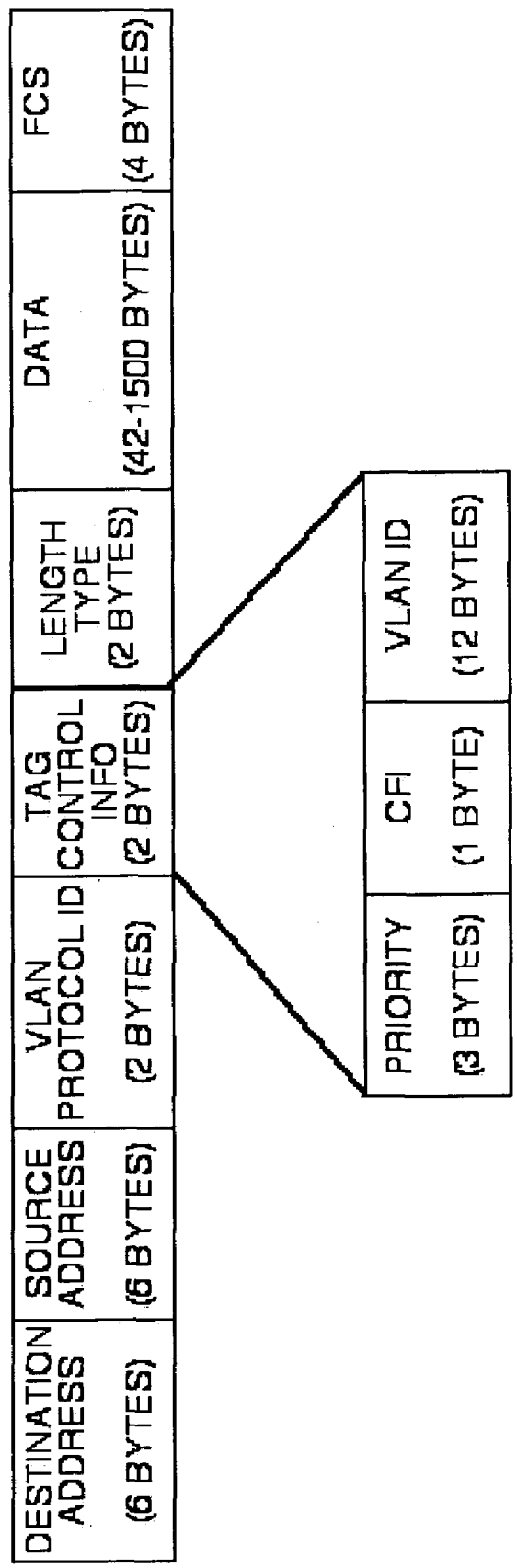
FIG. 9 is an example data packet, for a representative one of the nodes of the network.

The embodiment, including the features of FIGS. 9-11, supports a large number of VLANs and allows different VLAN domains to use same VLAN ID because a VLAN is identified by combination of a VLAN ID and a wavelength.

In one sense, granularity refers to the scalability of a device, which here would involve the scalability of the switch to handle an increase in the number of VLANs handled, as needed. While generally a marketing term with a loose meaning, granularity refers to the ability of a device to increase its functionality in small increments, without involving disproportionately large increases in cost. With the present embodiment, the functionality of the switch becomes a simple multiple of the functionality of using only the VLAN ID, with the multiple being equal to the number of separate wavelengths at the output, and the increased cost is primarily that of software and its installation. Therefore, the functionality is scaled up with a large increase at a proportionately very small increase in cost.

Some of the features of the present invention include the following. The known VLAN ID, for example in L2 or the MAC frame, is not modified, but is reused with respect to different paths or wavelengths to extend the capacity for different VLANS. The VLAN capacity is extended without increasing control traffic and particularly without involving the MANAGER in the management of the extension. Thereby the maximum number of VLANs that may be serviced at a node, the capacity, is increased in proportion to the number of paths or wavelengths.

Therefore, the embodiments described above are useful to network providers, such as public Ethernet local exchange carriers, who can thereby provide flexible VLAN service and manage their network resources effectively by increasing the network capacity for VLAN users. The embodiments can be used generally for virtual local area networks (VLANs) using WDM technology in the backbone network, metro area networks and access networks.

The embodiments may be used to transmit video services on a single optical fiber as narrow band services and use common equipment to support all the services. Frequency division multiplexing of the narrow band telephone service and control signals with EM channels for video distribution could be used. The system would be more flexible than the prior art for this use.

While the present invention has been described in connection with a number of embodiments and implementations, the present invention is not so limited but covers various obvious modifications and equivalent arrangements, which fall within the purview of the appended claims.

What is claimed is:

1. A switching method, for use in a VLAN (virtual local area network) including at least one WDM optical path, comprising:
    deriving a VLAN ID from a received packet;
    deriving a wavelength ID value related to a carrier wavelength of the received packet; and
    using at least both the VLAN ID value and the wavelength ID value for making an optical VLAN forwarding decision for the packet to provide a VLAN identifying capacity greater than that provided solely by a VLAN ID carried by a frame.

2. The method of claim 1, including:
    managing a forwarding database storing packet records including received and forwarded values for VLAN ID, and carrier wavelength; and
    said step of using further including searching the database for data forwarding information, and forwarding the packet in response to a result of said searching.

3. A computer readable media stored with computer readable data instructions that are executable for physically implementing the method of claim 2.

4. The method of claim 1, including:
    parsing a received packet and determining the presence of a valid VLAN ID field; and
    performing said two steps of deriving and said step of using only when there is a valid VLAN ID field.

5. The method of claim 4, including:
    managing a forwarding database storing packet records including received and forwarded values for VLAN ID, and carrier wavelength; and
    said step of using further including searching the database for data forwarding information, and forwarding the packet in response to a result of said searching.

6. The method of claim 1, including:
    parsing a received packet and determining the presence of a valid VLAN ID field;
    determining if a set maximum VLAN ID capacity has been reached; and
    performing said two steps of deriving and said step of using only when the maximum VLAN ID capacity has been reached.

7. The method of claim 6, including:
    managing a forwarding database storing packet records including received and forwarded values for VLAN ID, and carrier wavelength; and
    said step of using further including searching the database for data forwarding information, and forwarding the packet in response to a result of said searching.

8. A computer readable media stored with computer readable data instructions that are executable for physically implementing the method of claim 1.

9. A network node switching device for use in a VLAN (virtual local area network), comprising:
    means for switching a received packet at least from or to WDM optical paths,
    means for deriving a VLAN ID from the received packet;
    means for assigning a wavelength ID to the packet; and
    means for making a forwarding decision for the packet based upon at least both a VLAN ID value and a wavelength ID value to provide a VLAN identifying capacity greater than that provided solely by a VLAN ID carried by a frame.

10. The network node switching device of claim 9, wherein said means for assigning performs its function only when a forwarding database indicates a threshold value of used VLAN IDs has been reached.

11. The network node switching device of claim 9, wherein said means for assigning performs its function only when a valid VLAN ID is present in the received packet.

12. The network node switching device of claim 9, further including:
    means for managing a forwarding database storing packet records including received and forwarded values for VLAN ID and carrier wavelength.

13. A switch for forwarding a packet having a header with a VLAN ID, for use in controlling a link in a data transmission network to provide a VLAN identifying capacity greater than that provided solely by a VLAN ID carried by a frame, comprising:
    a port to receive the packet;
    a port to forward the packet;
    at least one of said ports having optical paths with WDM;
    a parsing engine to derive a VLAN ID value based upon a VLAN field in the received packet;
    a computer; and
    a computer readable media stored with computer readable data instructions that are executable by said computer for physically implementing the method of claim 1.

14. A switch for forwarding a packet having a header with a VLAN ID, for use in controlling a link in a data transmission network to provide a VLAN identifying capacity greater than that provided solely by a VLAN ID carried by a frame, comprising:
    a port to receive the packet;
    a port to forward the packet;
    at least one of said ports having optical paths with WDM;
    a parsing engine to derive a VLAN ID value based upon a VLAN field in the received packet;
    a computer; and
    a computer readable media stored with computer readable data instructions that are executable by said computer for physically implementing the method of claim 2.

15. A switch for forwarding a packet having a header with a VLAN ID, for use in controlling a link in a data transmission network to provide a VLAN identifying capacity greater than that provided solely by a VLAN ID carried by a frame, comprising:
- a port to receive the packet;
- a port to forward the packet;
- at least one of said ports having optical paths with WDM;
- a parsing engine to derive a VLAN ID value based upon a VLAN field in the received packet;
- a computer; and
- a computer readable media stored with computer readable data instructions that are executable by said computer for physically implementing the method of claim 4.

16. A switch for forwarding a packet having a header with a VLAN ID, for use in controlling a link in a data transmission network to provide a VLAN identifying capacity greater than that provided solely by a VLAN ID carried by a frame, comprising:
- a port to receive the packet;
- a port to forward the packet;
- at least one of said ports having optical paths with WDM;
- a parsing engine to derive a VLAN ID value based upon a VLAN field in the received packet;
- a computer; and
- a computer readable media stored with computer readable data instructions that are executable by said computer for physically implementing the method of claim 5.

17. A switch for forwarding a packet having a header with a VLAN ID, for use in controlling a link in a data transmission network to provide a VLAN identifying capacity greater than that provided solely by a VLAN ID carried by a frame, comprising:
- a port to receive the packet;
- a port to forward the packet;
- at least one of said ports having optical paths with WDM;
- a parsing engine to derive a VLAN ID value based upon a VLAN field in the received packet;
- a computer; and
- a computer readable media stored with computer readable data instructions that are executable by said computer for physically implementing the method of claim 6.

18. A switch for forwarding a packet having a header with a VLAN ID, for use in controlling a link in a data transmission network to provide a VLAN identifying capacity greater than that provided solely by a VLAN ID carried by a frame, comprising:
- a port to receive the packet;
- a port to forward the packet;
- at least one of said ports having optical paths with WDM;
- a parsing engine to derive a VLAN ID value based upon a VLAN field in the received packet;
- a computer; and
- a computer readable media stored with computer readable data instructions that are executable by said computer for physically implementing the method of claim 7.

19. A method of transmitting information, comprising:
- receiving first and second VLAN (Virtual Local Area Network) tagged frames with both frames having the same VLAN ID (Identification);
- transmitting the first frame over an optical fiber with a first wavelength and of a WDM (Wavelength Division Multiplexing) network; and
- transmitting the second frame over the optical fiber with a second wavelength different from the first wavelength and over the WDM (Wavelength Division Multiplexing) network.

* * * * *